United States Patent [19]
Grobey

[11] 3,982,593
[45] Sept. 28, 1976

[54] POWER CULTIVATOR WITH RECIPROCATING BLADE

[76] Inventor: Paul A. Grobey, R.F.D. 1, Box 586, Springfield, Vt. 05156

[22] Filed: Oct. 16, 1974

[21] Appl. No.: 515,379

Related U.S. Application Data

[63] Continuation-in-part of Ser. No. 461,085, April 15, 1974, abandoned.

[52] U.S. Cl. ................. 172/40; 172/42; 172/44; 172/102; 172/484; 172/765
[51] Int. Cl.² .......................... A01B 39/10
[58] Field of Search ........... 172/6, 36, 40, 42, 43, 172/44, 101, 102, 118, 119, 120, 125, 376, 377, 378, 612, 720, 765, 484

[56] References Cited
UNITED STATES PATENTS

| 766,031 | 7/1904 | Fuller | 172/720 X |
|---|---|---|---|
| 1,428,194 | 9/1922 | Von Meyenburg | 172/125 |
| 1,614,808 | 1/1927 | Suek et al. | 172/720 X |
| 2,550,522 | 4/1951 | Bolongaro | 172/40 |
| 2,553,926 | 5/1951 | Lund | 172/125 |
| 2,706,439 | 4/1955 | Ellingboe | 172/101 X |
| 2,755,717 | 7/1956 | Wirth | 172/42 |
| 3,042,123 | 7/1962 | Fry | 172/720 |
| 3,513,917 | 5/1970 | Stober | 172/42 X |
| 3,633,678 | 1/1972 | Leduc | 172/102 X |
| 3,935,905 | 2/1976 | Chery | 172/40 |

FOREIGN PATENTS OR APPLICATIONS

| 134,331 | 7/1933 | Austria | 172/376 |
|---|---|---|---|
| 585,603 | 12/1924 | France | 172/376 |
| 383,471 | 4/1963 | Japan | 172/42 |
| 608,512 | 9/1948 | United Kingdom | 172/42 |

*Primary Examiner*—Richard T. Stouffer
*Attorney, Agent, or Firm*—Sughrue, Rothwell, Mion, Zinn and Macpeak

[57] ABSTRACT

A cultivating machine having a body, at least one wheel supporting the body during normal use, and one or more soil-working blades. The blade(s) may be either serrated or generally V-shaped so that it can penetrate the soil and loosen it. The blade(s) is preferably rounded, so that it loosens the soil and pulls weeds out by the roots rather than cutting the tops of the weeds off and leaving the bottoms of the weeds in the ground to regrow, and the blade or at least one of the blades preferably projects laterally beyond the body of the cultivator on at least one side so that the cultivator may be used to loosen the soil and to pull out weeds underneath overhanging leaves of desirable plants without damaging the desirable plants by contact with moving parts of the cultivator. A motor may be mounted on the body and operatively connected to either or both of the wheel and the blades. For the blades, when motor driven, an eccentric roll mounted on a drive shaft and a parallelogram linkage are utilized to effect reciprocation of the blades.

28 Claims, 16 Drawing Figures

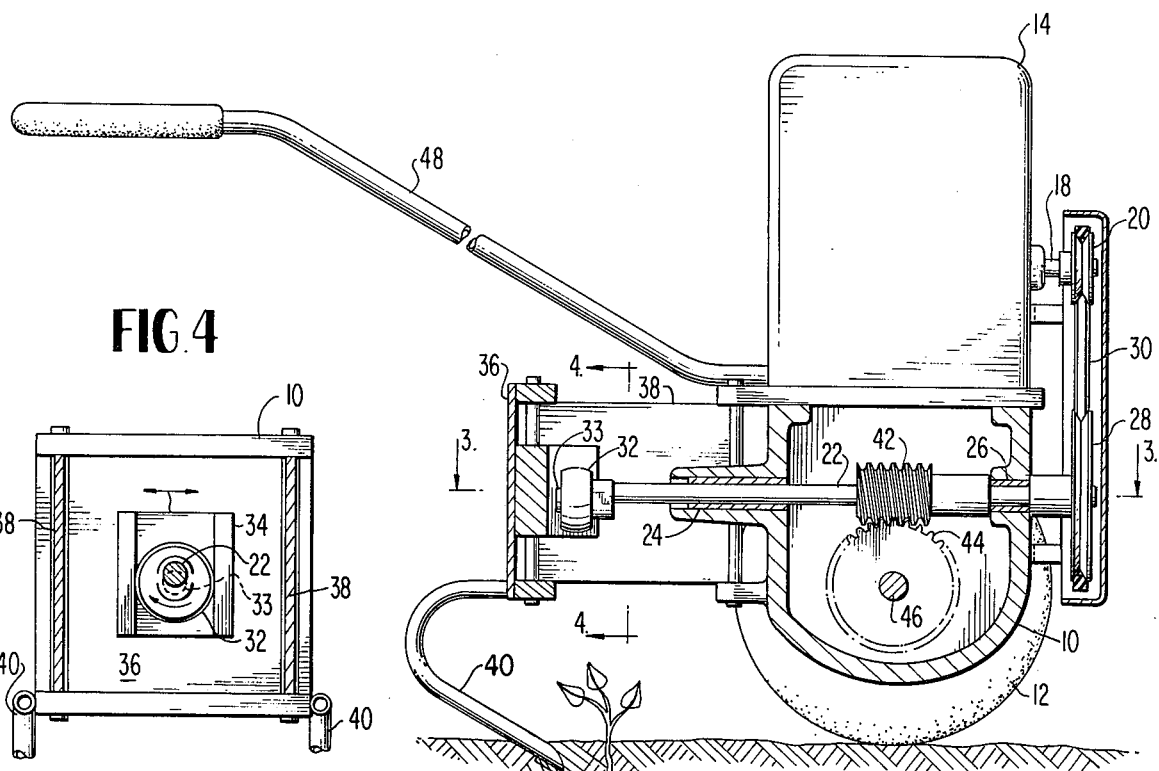
FIG.1
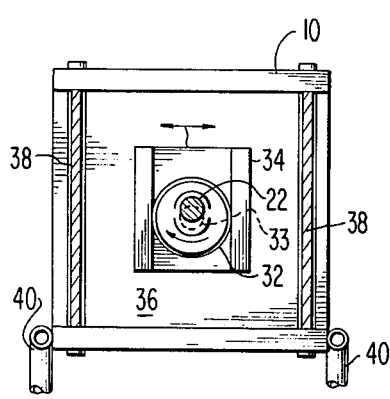
FIG.4
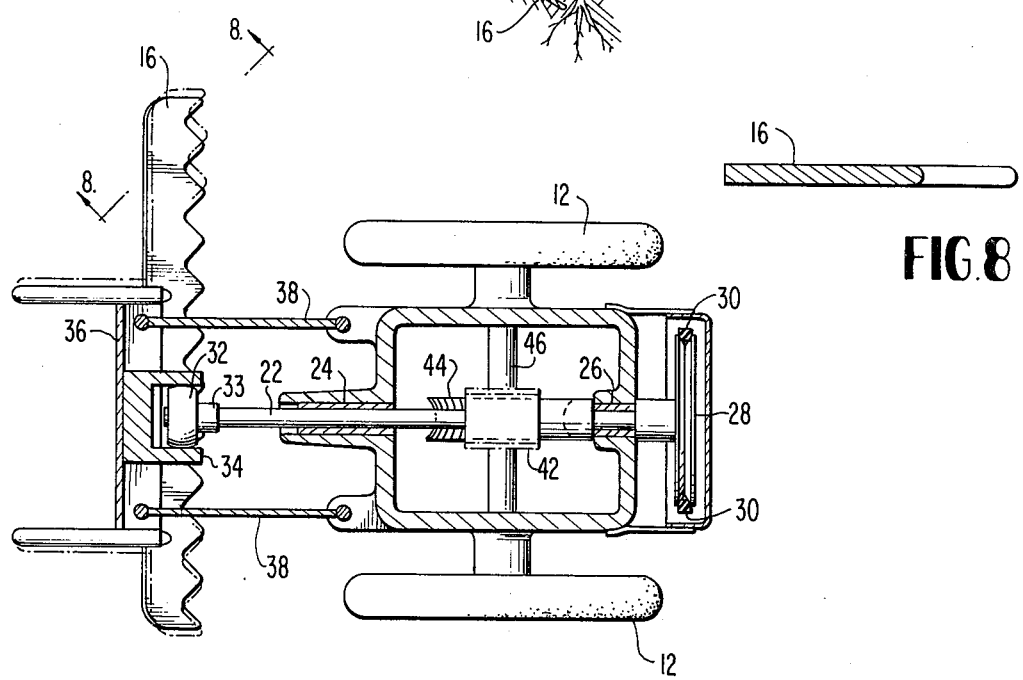
FIG.3
FIG.8

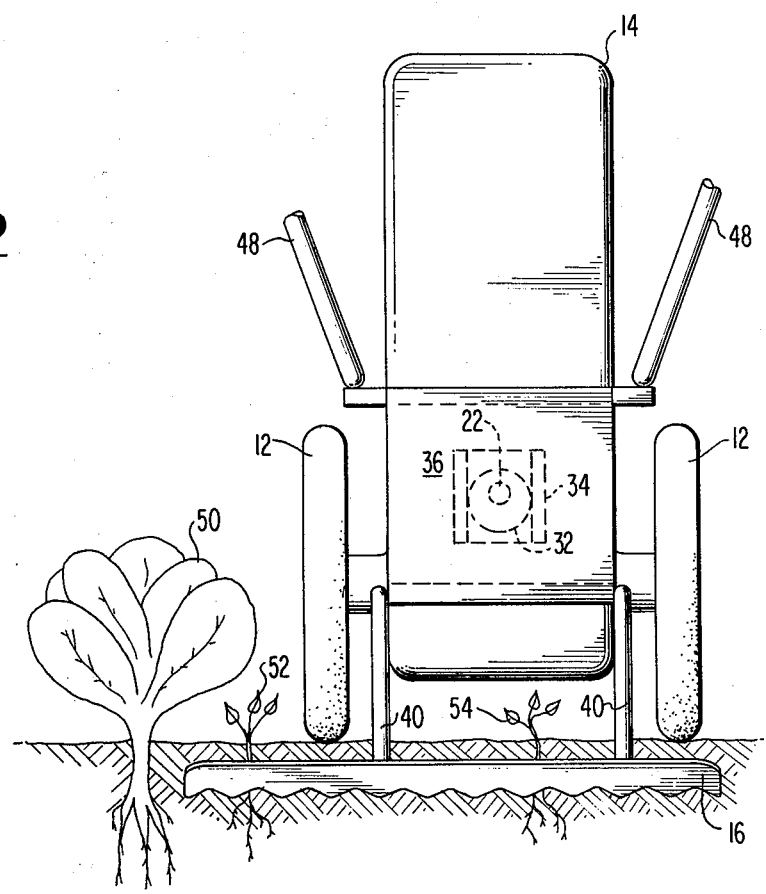
FIG.2
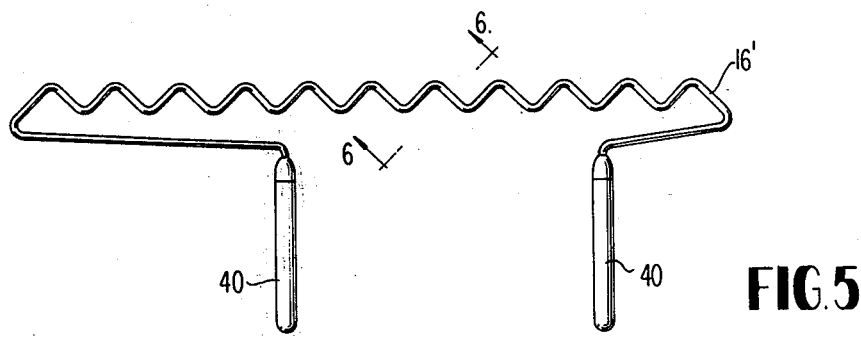
FIG.5
FIG.6
FIG.7

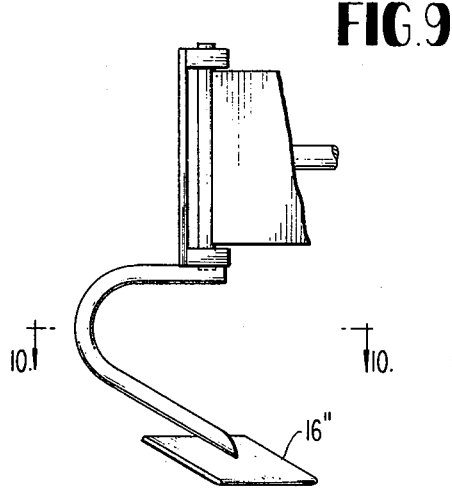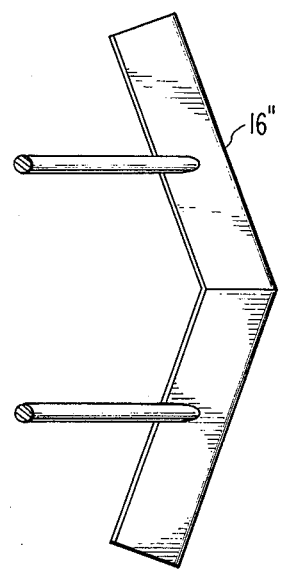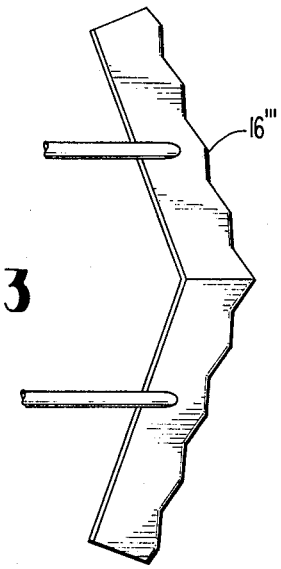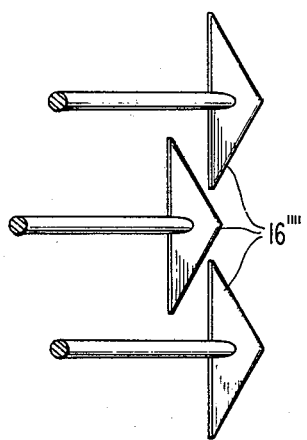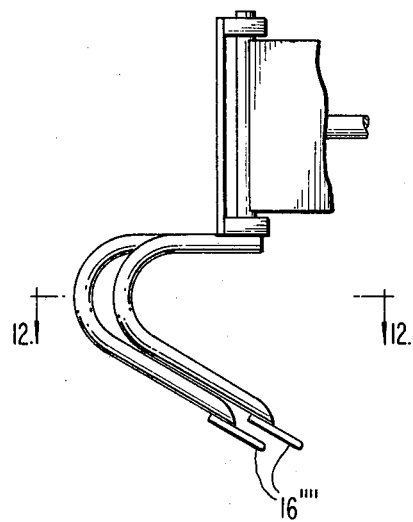

POWER CULTIVATOR WITH RECIPROCATING BLADE

CROSS REFERENCE TO A RELATED APPLICATION

This application is a CIP of application Ser. No. 461,085, filed Apr. 15, 1974, and abandoned subsequent to the filing of the present application.

BACKGROUND OF THE INVENTION

1. Field of the Invention

This invention relates to agricultural equipment, particularly cultivating machines.

2. Description of the Prior Art

As far as I am aware, the relevant prior art consists of, on the one hand, manually operated cultivating tools having a loop of round steel wire attached to a long handle and, on the other hand, powered cultivators such as rotary tillers and the devices disclosed in U.S. Pat. Nos. 2,517,733 to Takats, 2,755,717 to Wirth, and 2,859,676 to Pottol et al. which employ moving tines or sharp cutting blades disposed beneath the body of the cultivator. The former are subject to the obvious disadvantage of all manually operated tools, and the latter are subject to the following disadvantages: (1) while some do cut the tops of weeds off, they leave the roots of the weeds in the ground, permitting many of the weeds to regrow from the roots, (2) some miss a substantial portion of the weeds, (3) they cannot be used to cultivate close to overhanging crops without damaging the tops of the crops, and (4) some dislodge chunks of soil and stones and therefore cannot be used to cultivate close to delicate plants without damaging or covering these plants.

SUMMARY OF THE INVENTION

The present invention is intended to overcome the above disadvantages of the known prior art in a simple, economical, and easy handling machine. Such a machine comprises a body, at least one wheel supporting the body during normal use, and one or more soil-working blades. The blade(s) may be either serrated or V-shaped, so that it can penetrate the soil and loosen it. Its or their motion loosens the soil and either cuts the weeds or shakes them loose from the soil. The blades(s) is preferably rounded, so that it pulls weeds out by the roots rather than cutting the tops of the weeds off and leaving the bottoms of the weeds in the ground to regrow, and the blade or at least one of the blades preferably projects laterally beyond the body of the cultivator on at least one side so that the cultivator may be used to loosen the soil and to dispose of weeds underneath overhanging leaves of desirable plants without damaging the desirable plants by contact with moving parts of the cultivator. A motor may be mounted on the body and operatively connected to either or both of the wheel and the blades. If no motor is used, the soil-working blades can be operatively connected to the wheel, and the machine can be drawn over the ground surface by a tractor, a man, or some other kind of animal.

BRIEF DESCRIPTION OF THE DRAWINGS

FIG. 1 is a side view, partially in section, of a preferred embodiment of the present invention.

FIG. 2 is a rear-end view, partially cut away, of the embodiment shown in FIG. 1.

FIG. 3 is a sectional view along the lines 3—3 in FIG. 1.

FIG. 4 is a sectional view along the lines 4—4 in FIG. 1.

FIG. 5 is a plan view of an alternative embodiment of the blade 16, as best seen in FIGS. 2 and 3.

FIG. 6 is a sectional view along the lines 6—6 in FIG. 5 of one embodiment of the blade shown in FIG. 5.

FIG. 7 is a sectional view along the lines 6—6 in FIG. 5 of another embodiment of the blade shown in FIG. 5.

FIG. 8 is a sectional view along the lines 8—8 in FIG. 3.

FIG. 9 is a side view of the rear portion of a first alternative embodiment of the present invention.

FIG. 10 is a sectional view along the lines 10—10 in FIG. 9.

FIG. 11 is a side view of the rear portion of a second alternative embodiment of the present invention.

FIG. 12 is a sectional view along the lines 12—12 in FIG. 11.

FIGS. 13-16 are sectional views generally corresponding to FIG. 10 but of alternative embodiments.

DETAILED DESCRIPTION OF THE PREFERRED EMBODIMENTS

Figure 14:
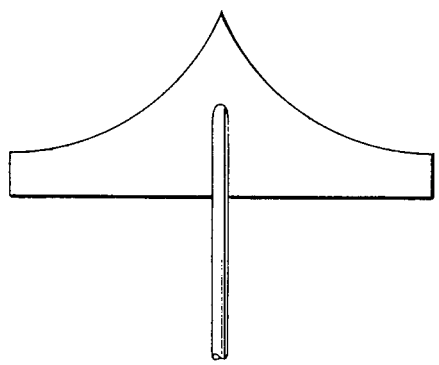

FIGS. 1-4 show the originally conceived embodiment of the present invention. It comprises a body 10, tub wheels 12 which support the body 10 during normal use, a motor 14 mounted on the body 10, a soil working blade 16, and means for operatively linking the motor 14 to the blade 16. In the preferred embodiments of the invention, the means for operatively linking the motor 14 to the blade 16 comprise a motor output shaft 18, a sheave 20 mounted on the shaft 18, a shaft 22 journalled for rotational motion in bearings 24 and 26 mounted in the body 10, a sheave 28, a roll 32 journalled on an eccentric stud 33 mounted on the shaft 22, a follower 34 mounted for horizontal movement in an extension 36 of the body 10 and in contact with and responsive to the motion of the roll 32, a parallelogram linkage 38 connecting the body 10 to the extension 36, and two large, hook-shaped members 40 connecting the extension 36 to the blade 16. The members 40 serve to position the blade 16 such that, when the cultivator is being moved over a ground surface during normal use, the blade 16 is located beneath the surface of the ground in an orientation generally parallel to the surface of the ground and generally perpendicular to the motion of the cultivator. The means for operatively linking the motor 14 to the blade 16 can be used to cause the blade 16 to reciprocate in a direction generally perpendicular to the motion of the cultivator during normal use. Of course, the parallelogram linkage 38 causes a small amount of cyclical motion of the follower 34 and the extension 36 parallel to the shaft 22, and the cultivator must be designed to take this into account. As may be seen in FIGS. 1 and 3, a clearance has been left between the rear end of the roll 32 and the inside face of the follower 34 for this purpose.

As best seen in FIGS. 2, 3, and 8, the blade 16 is serrated, and, in its preferred form, it has a plurality of teeth the contour and all of the edges of which are well rounded. Alternatively, as seen in FIG. 5, the blade 16 can be replaced by a blade 16' formed of a rounded, zig-zag shaped wire. The rounded, zig-zag shaped wire may be round in cross section, as shown in FIG. 6, or it may have an oval cross section, as shown in FIG. 7. In the latter construction, the major axis of the oval cross section is parallel to the primary motion of the cultivator when it is being moved over a ground surface during normal use in order to strengthen the blade against damage by obstructions, most of which will be encountered in the direction of motion of the cultivator. While the shape of the blade shown in FIGS. 1–3 and 8 was that originally conceived, it is now believed that the shapes shown in FIGS. 5–7 may reduce the manufacturing cost of the cultivator. However, regardless of the specific shape of the blade, one objective is to make it well rounded so that it will pull out weeds without cutting off their roots. However, the blade according to this invention may be removably mounted on the members 40 so that it may be replaced at the option of the user by a sharp serrated blade for use where weeds are heavy and therefore cannot be dislodged with a rounded blade. While the sharp serrated blade loosens the soil in the same manner as the rounded blade, it cuts through the weeds below the soil surface to at least retard their growth.

Preferably the motor 14 is operatively connected to the wheels 12 so that it powers the wheels as well as the blade. As best seen in FIG. 1, in the preferred embodiments this is accomplished by mounting a worm 42 on the shaft 22 and a worm gear 44 engaged by the worm 42 on a shaft 46 which drives the wheels 12. A handle 48 having appropriate motor controls (not shown) may be attached to the body 10 for use in controlling the movement of the cultivator and for ensuring that the blade remains at the appropriate level beneath the ground surface during use of the cultivator.

As will be obvious to the reader, the same basic cultivating machine with no motor and having the soil-working blade or blades operatively connected to the wheel so that the rotary motion of the wheel drives the blade or blades can be used to loosen the soil and to dispose of weeds when drawn over the ground surface by a tractor, a man, or some other kind of animal.

In order to permit the cultivator to be used to loosen the soil and to dislodge weeds underneath overhanging leaves of desirable plants without damaging the desirable plants by contact with moving parts of the cultivator, the blade 16 or 16' is preferably designed to project laterally beyond the wheels 12 of the cultivator on at least one side thereof. This construction may be seen in FIGS. 2, 3 and 5. Of course, the blade may be designed to project laterally on both sides of the cultivator. The purpose of this construction is illustrated in FIG. 2, wherein the plant 50 is a desirable plant and the plants 52 and 54 are weeds to be eliminated.

If a cultivator as shown in FIG. 1 is run at a high speed, the motion of the blade may cause the entire cultivator to vibrate unpleasantly. In order to compensate for the changes in the momentum of the blade shown, a second blade may be added the motion of which is equal and opposite to that of the first blade, thereby cancelling out the inertial effects of the first blade. Normally, in a small cultivator, the second blade would be disposed parallel to and longitudinally spaced from the first blade. However, in a larger cultivator, a plurality of blades can be transversely spaced to permit the blade to follow variations in the contour of the land being cultivated.

While the serrated blade shown in FIG. 5 works well in most situations, it has been found that the stringy roots of witch grass (also called quack grass) tend to foul a blade such as is shown in FIG. 5. To overcome this problem, a V-shaped blade 16'' having straight forward edges such as is shown in FIGS. 9 and 10, a V-shaped blade 16''' having shallow teeth or undulations such as is shown in FIG. 13 or a plurality of laterally overlapping V-shaped blades 16'''' such as are shown in FIGS. 11 and 12 may be used. The V-shaped blade or blades preferably have rounded, or blunt, forward edges so that, like the blades previously described, they will not cut roots, but rather will pull plants out by the roots. The long stringy roots of witch grass tend to lodge in the valleys of the serrated blade shown in FIG. 5, but the V-shaped blades allow the roots to work back towards the sides of the blades and eventually to drop off the ends.

Figure 15:
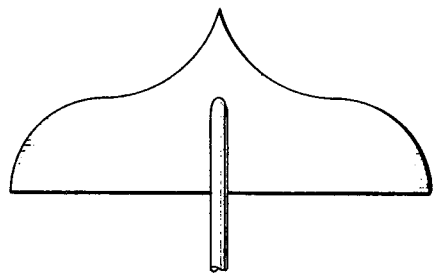
Figure 16:
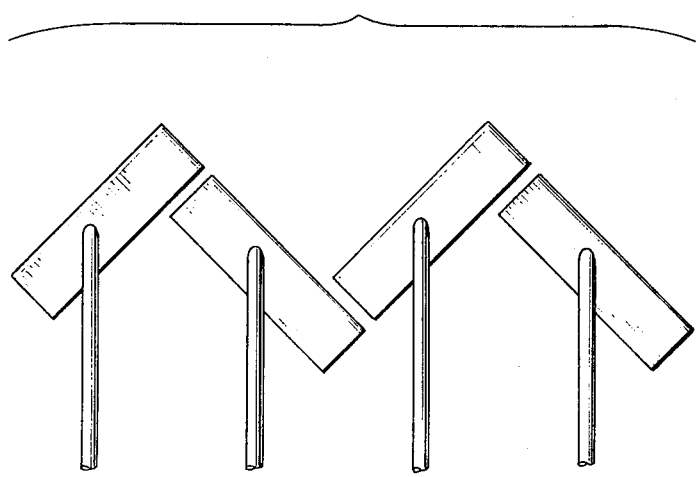

A number of other alternative blade embodiments are shown in FIGS. 14–16. The common feature of these embodiments is at least one edge which sweeps backwards from a forwardly projecting point to a lateral edge of the blade, so that roots of plants which are draped around the blade will work backwards towards the lateral edge and eventually drop off. Of course, these blades can be used either singly or multiply and may have either smooth or toothed edges, and the edges may be either sharp or blunt.

Caveat

While the present invention has been illustrated by a detailed description of preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:
1. A power cultivator comprising:
   a. a body;
   b. a wheel supporting said body during normal use;
   c. a rotor mounted on said body;
   d. a serrated blade which has a plurality of teeth the contour and all the edges of which are well rounded;
   e. means for movably mounting said blade on said body in a position such that, when the cultivator is being moved over a ground surface during normal use, the working surface of said blade is located beneath the surface of the ground in a plane generally parallel to the surface of the ground and generally perpendicular to the motion of the cultivator;
   f. a shaft driven rotationally by said motor during normal use;
   g. an eccentric roll mounted on said shaft;
   h. a follower in contact with and responsive to said eccentric roll;
   i. means connecting said follower to said blade; and
   j. a parallelogram linkage included as part of said means movably mounting said blade, said linkage connecting said body to said blade,
whereby, when said motor is functioning and the cultivator is being moved over a ground surface during normal use, the working surface of said blade will reciprocate in a direction generally perpendicular to the motion of the cultivator and in a plane generally parallel to the surface of the ground, thereby loosening the soil and pulling out weeds without cutting off their roots.

2. A power cultivator as claimed in claim 1 and further comprising means for operatively connecting said shaft to said wheel, whereby the rotational motion of said shaft is transmitted to said wheel.

3. A power cultivator as claimed in claim 1 and further comprising means for operatively connecting said motor to said wheel, whereby said motor powers said wheel as well as said blade.

4. A power cultivator as claimed in claim 1 wherein said blade projects laterally beyond said body on at least one side of the cultivator, whereby the cultivator may be used to loosen the soil and to remove weeds underneath overhanging leaves of desirable plants without damaging the desirable plants by contact with moving parts of the cultivator.

5. A power cultivator as claimed in claim 1 wherein said blade is formed of a rounded, zig-zag shaped wire, the zig-zags in which form the plurality of teeth.

6. A power cultivator as claimed in claim 5 wherein said blade is round in cross section.

7. A power cultivator as claimed in claim 5 wherein said blade is oval in cross section, the major axis of the oval cross section being parallel to the primary motion of the cultivator when it is being moved over a ground surface during normal use.

8. A power cultivator comprising:
  a. a body;
  b. a wheel supporting said body during normal use;
  c. a motor mounted on said body;
  d. a blade the contour and all the edges of which are well rounded;
  e. a shaft driven rotationally by said motor during normal use;
  f. an eccentric roll mounted on said shaft;
  g. a follower in contact with and responsive to said eccentric roll;
  h. means for connecting said follower to said blade such that, when the cultivator is being moved over a ground surface during normal use, the working surface of said blade is located beneath the surface of the ground in a plane generally parallel to the surface of the ground and generally perpendicular to the motion of the cultivator; and
  i. a parallelogram linkage connecting said body to said follower,
whereby, when said motor is functioning and the cultivator is being moved over a ground surface during normal use, the working surface of said blade will reciprocate in a direction generally perpendicular to the motion of the cultivator and in a plane generally parallel to the surface of the ground, thereby loosening the soil and pulling out weeds without cutting off their roots.

9. A power cultivator as claimed in claim 8 and further comprising means for operatively connecting said shaft to said wheel, whereby the rotational motion of said shaft is transmitted to said wheel.

10. A power cultivator as claimed in claim 8 and further comprising means for operatively connecting said motor to said wheel, whereby said motor powers said wheel as well as said blade.

11. A power cultivator as claimed in claim 8 wherein said blade projects laterally beyond said body on at least one side of the cultivator, whereby the cultivator may be used to loosen the soil and to remove weeds underneath overhanging leaves of desirable plants without damaging the desirable plants by contact with moving parts of the cultivator.

12. A power cultivator as claimed in claim 8 wherein said blade is formed of a rounded, zig-zag shaped wire, the zig-zags in which form the plurality of teeth.

13. A power cultivator as claimed in claim 12 wherein said blade is round in cross section.

14. A power cultivator as claimed in claim 12 wherein said blade is oval in cross section, the major axis of the oval cross section being parallel to the primary motion of the cultivator when it is being moved over a ground surface during normal use.

15. A power cultivator comprising:
  a. a body;
  b. a wheel supporting said body during normal use;
  c. a motor mounted on said body;
  d. a blade;
  e. means for movably mounting said blade on said body in a position such that
    i. when the cultivator is being moved over a ground surface during normal use, the working surface of said blade is located beneath the surface of the ground in a plane generally parallel to the surface of the ground and generally perpendicular to the motion of the cultivator and
    ii. said blade projects laterally beyond said body on at least one side of the cultivator;
  f. a shaft driven rotationally by said motor during normal use;
  g. an eccentric roll mounted on said shaft;
  h. a follower in contact with and responsive to said eccentric roll;
  i. means connecting said follower to said blade; and
  j. a parallelogram linkage included as part of said means movably mounting said blade, said linkage connecting said body to said blade,
whereby, when said motor is functioning and the cultivator is being moved over a ground surface during normal use, the working surface of said blade will reciprocate in a direction generally perpendicular to the motion of the cultivator and in a plane generally parallel to the surface of the ground, thereby loosening the soil and pulling out weeds without cutting off their roots.

16. A power cultivator as claimed in claim 15 wherein said blade is a serrated blade having a plurality of teeth, the contour and all of the edges of the teeth being well rounded, whereby said blade will loosen the soil and also pull out weeds without cutting off their roots.

17. A power cultivator as claimed in claim 15 wherein said blade is formed of a rounded, zig-zag shaped wire, the zig-zags in which form a plurality of teeth, whereby said blade will loosen the soil and also pull out weeds without cutting off their roots.

18. A power cultivator as claimed in claim 17 wherein said blade is round in cross section.

19. A power cultivator as claimed in claim 17 wherein said blade is oval in cross section, the major axis of the oval cross section being parallel to the primary motion of the cultivator when it is being moved over a ground surface during normal use.

20. A power cultivator as claimed in claim 15 and further comprising means for operatively connecting said shaft to said wheel, whereby the rotational motion of said shaft is transmitted to said wheel.

21. A power cultivator as claimed in claim 15 and further comprising means for operatively connecting said motor to said wheel, whereby said motor powers said wheel as well as said blade.

22. A power cultivator comprising:
a. a body;
b. a wheel supporting said body during normal use;
c. a motor mounted on said body;
d. a blade;
e. a shaft driven rotationally by said motor during normal use;
f. an eccentric roll mounted on said shaft;
g. a follower in contact with and responsive to said eccentric roll;
h. means for connecting said follower to said blade such that
   i. when the cultivator is being moved over a ground surface during normal use, the working surface of said blade is located beneath the surface of the ground in a plane generally parallel to the surface of the ground and generally perpendicular to the motion of the cultivator and
   ii. said blade projects laterally beyond said body and at least one side of the cultivator;
   i. a parallelogram linkage connecting said body to said follower, whereby, when said motor is functioning and the cultivator is being moved over a ground surface during normal use, the working surface of said blade will reciprocate in a direction generally perpendicular to the motion of the cultivator and in a plane generally parallel to the surface of the ground, thereby loosening the soil and pulling out weeds without cutting off their roots.

23. A power cultivator as claimed in claim 22 wherein said bladed is a serrated blade having a plurality of teeth, the contour and all of the edges of the teeth being well rounded, whereby said blade will loosen the soil and also pull out weeds without cutting off their roots.

24. A power cultivator as claimed in claim 22 wherein said blade is formed of a rounded, zig-zag shaped wire, the zig-zags in which form a plurality of teeth, whereby said blade will loosen the soil and also pull out weeds without cutting off their roots.

25. A power cultivator as claimed in claim 24 wherein said blade is round in cross section.

26. A power cultivator as claimed in claim 24 wherein said blade is oval in cross section, the major axis of the oval cross section being parallel to the primary motion of the cultivator when it is being moved over a ground surface during normal use.

27. A power cultivator as claimed in claim 22 and further comprising means for operatively connecting said shaft to said wheel, whereby the rotational motion of said shaft is transmitted to said wheel.

28. A power cultivator as claimed in claim 22 and further comprising means for operatively connecting said motor to said wheel, whereby said motor powers said wheel as well as said blade.

* * * * *